US012246618B2

(12) United States Patent
Gannamaneni et al.

(10) Patent No.: US 12,246,618 B2
(45) Date of Patent: Mar. 11, 2025

(54) CONVERTER SYSTEM FOR TRANSFERRING ELECTRIC POWER

(71) Applicant: Volvo Car Corporation, Gothenburg (SE)

(72) Inventors: Narendar Rao Gannamaneni, Gothenburg (SE); Ali Dareini, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 275 days.

(21) Appl. No.: 18/155,883

(22) Filed: Jan. 18, 2023

(65) Prior Publication Data

US 2023/0234473 A1  Jul. 27, 2023

(30) Foreign Application Priority Data

Jan. 21, 2022  (EP) .................................... 22152825

(51) Int. Cl.
*B60L 58/20* (2019.01)
*B60L 3/00* (2019.01)
*B60L 53/24* (2019.01)

(52) U.S. Cl.
CPC .............. *B60L 58/20* (2019.02); *B60L 3/003* (2013.01); *B60L 53/24* (2019.02); *B60L 2210/10* (2013.01)

(58) Field of Classification Search
None
See application file for complete search history.

(56) References Cited

U.S. PATENT DOCUMENTS

| 9,834,113 | B2 | 12/2017 | Gunnerud et al. |
| 2012/0187759 | A1 | 7/2012 | Kamichi et al. |

(Continued)

FOREIGN PATENT DOCUMENTS

| CN | 113824087 A | 12/2021 |
| KR | 20160049334 A | 5/2016 |

OTHER PUBLICATIONS

Extended EP Search Report for EP Application No. 22152825.0 dated Jul. 11, 2022.

(Continued)

*Primary Examiner* — Jared Fureman
*Assistant Examiner* — Aqeel H Bukhari
(74) *Attorney, Agent, or Firm* — Amin, Turocy & Watson, LLP

(57) ABSTRACT

The present disclosure relates to a converter system for transferring electric power, a vehicle comprising such a converter system and a method for transferring electric power. The converter system comprises a first DC/DC converter module, a second DC/DC converter module and a control unit. The first DC/DC converter module is connectable to a first high voltage system and at least to a first low voltage system. The second DC/DC converter module is connectable to a second high voltage system and at least to the first low voltage system. The first DC/DC converter module comprises at least a first main DC/DC converter unit and a first micro DC/DC converter unit. The second DC/DC converter module comprises at least a second micro DC/DC converter unit. The first micro DC/DC converter unit and the second micro DC/DC converter unit are connectable via a first bidirectional switch unit. The control unit is configured to transfer the electric power from the first high voltage system to the first low voltage system via the first micro DC/DC converter unit, if the first main DC/DC converter unit (Continued)

unit is deactivated. The control unit is further configured to open the first bidirectional switch unit to transfer the electric power from the second high voltage system to the first low voltage system via the second micro DC/DC converter unit, if the first main DC/DC converter unit is deactivated and the first micro DC/DC converter unit has a failure.

15 Claims, 6 Drawing Sheets

(56) References Cited

U.S. PATENT DOCUMENTS

| | | | |
|---|---|---|---|
| 2019/0232788 A1* | 8/2019 | Kimura | B60L 53/16 |
| 2019/0366861 A1* | 12/2019 | Satake | B60L 3/0092 |
| 2023/0261559 A1* | 8/2023 | Redler | H02M 3/1582 |
| | | | 307/18 |

OTHER PUBLICATIONS

Communication pursuant to Article 94(3) EPC for EP Application No. 22152825.0 dated Mar. 28, 2024.

* cited by examiner

CONVERTER SYSTEM FOR TRANSFERRING ELECTRIC POWER

TECHNICAL FIELD

The present disclosure relates to a converter system for transferring electric power, a vehicle comprising such a converter system and a method for transferring electric power.

BACKGROUND ART

In electric vehicles, there are different power converter modules, which are functional under different scenarios. For example, an on-board charger converts AC to DC to charge a high voltage battery and a traction inverter converts DC to AC to drive the vehicle. In both scenarios, either the on-board charger or the traction inverter is functional. However, in order to supply power to low voltage loads and to maintain a low voltage, a DC-DC converter, which transfers power from the high voltage battery to the low voltage loads, must be functional under both scenarios.

The DC-DC converter is generally more stressed when compared to other power converter modules, which makes design requirements of the DC-DC converter more complex. In conventional electric vehicles, a low voltage control unit relies on a low voltage battery supply. If the DC-DC converter fails during driving, some of vehicle functions supplied from the low voltage system could be at risk, particularly when a charge state on a low voltage battery is low. Moreover, the DC-DC converter is turned off when the vehicle is in key-off state. Accordingly, if the vehicle is parked for some months, the low voltage battery will be in deep discharge state and the vehicle may be completely shut down.

SUMMARY

Hence, there may be a need to provide an improved converter system, which allows a more reliable low voltage supply.

The problem is at least partially solved or alleviated by the subject matter of the independent claims of the present disclosure, wherein further examples are incorporated in the dependent claims. It should be noted that the aspects of the disclosure described in the converter system for transferring electric power, the vehicle comprising such a converter system and the method for transferring electric power.

According to the present disclosure, a converter system for transferring electric power is presented. The converter system comprises a first DC/DC converter module, a second DC/DC converter module and a control unit. The first DC/DC converter module is connectable to a first high voltage system and at least to a first low voltage system. The second DC/DC converter module is connectable to a second high voltage system and at least to the first low voltage system. The first DC/DC converter module comprises at least a first main DC/DC converter unit and a first micro DC/DC converter unit. The second DC/DC converter module comprises at least a second micro DC/DC converter unit. The first micro DC/DC converter unit and the second micro DC/DC converter unit are connectable via a first bidirectional switch unit. The control unit is configured to transfer the electric power from the first high voltage system to the first low voltage system via the first micro DC/DC converter unit, if the first main DC/DC converter unit is deactivated. The control unit is further configured to open the first bidirectional switch unit to transfer the electric power from the second high voltage system to the first low voltage system via the second micro DC/DC converter unit, if the first main DC/DC converter unit is deactivated and the first micro DC/DC converter unit has a failure.

The converter system of the present disclosure may reduce a risk of single point failures inside the converter system, i.e. the first DC/DC converter module, the second DC/DC converter module. In particular, the converter system may still operate even in case of a malfunction of the first converter unit and/or second converter unit, by providing power to the low voltage system(s) under different vehicle usage scenarios (driving, charging and/or parking etc.). Accordingly, a high safety integration of the converter system may be achieved.

Further, the low voltage system may be interconnected inside the same housing of the power converter system in order to ensure the maximum availability of power supply and provide the power with highest efficiency. The best efficiency may be achieved by controlling an output voltage of the DC/DC converter unit when the vehicle is in a non-driving state.

The first DC/DC converter module and/or the second DC/DC converter module may transfer power from a high voltage system to a low voltage system. The high voltage system may provide a voltage of 400V or 800V. However, an inlet voltage of the high voltage system may vary depending on the configuration of the high voltage system. For instance, an inlet voltage of the high voltage system may vary in case of 400V between 250V and 500V and in case of 800V between 500V and 1000V depending on the configuration of the high voltage system.

The first DC/DC converter module and/or the second DC/DC converter module may operate dependently of a load consumption in order to maximize an efficiency of the converter system. In other words, the first DC/DC converter module and/or the second DC/DC converter module may operate alone or together to provide an efficient power supply.

The first DC/DC converter module and the second DC/DC converter module may comprise an isolated DC/DC converter element. The isolated DC/DC converter element may be galvanically isolated and may prevent an occurrence of an overvoltage due to an isolation fault in a higher voltage part of the converter system. The isolated DC/DC converter element may allow a lower cost for the at least one auxiliary component and may enable the compatibility with existing fast-charge DC-charging stations.

Each of the first high voltage system and the second high voltage system may comprise a high voltage interface, which may ensure a reliable connection between the first DC/DC converter module and the first high voltage system and between the second DC/DC converter module and the second high voltage system, respectively. Each high voltage system may comprises one battery unit or several battery units. The first high voltage system and the second high voltage system may be the same or separated from each other.

Likewise, the first low voltage system may also comprise a first low voltage interface ensuring a reliable connection between the first DC-DC module and the first low voltage system and/or between the second DC/DC converter module and the first low voltage system. The first low voltage system may be coupled with low voltage loads such as control components for opening a door or a window to open, starting the motor, steering and braking loads etc.

The first main DC/DC converter unit may be designed to provide high power, for instance in a range of 3 kW to 4 kW when activated. The first micro DC/DC converter unit may be designed to provide lower power, for instance in a range of 50 W to 200 W, when the first main DC/DC converter unit is deactivated and the first micro DC/DC converter unit is activated. If the converter system may be integrated in a vehicle, the first main DC/DC converter unit may be deactivated during a parking state of the vehicle and only the first micro DC/DC converter unit and/or the second micro DC/DC converter unit may be activated to supply power to the low voltage loads.

The second DC/DC converter module may also have a similar composition and comprise at least the second micro DC/DC converter unit. The second micro DC/DC converter unit may be also configured to provide lower power, for instance in a range of 50 W to 200 W, when the first main DC/DC converter unit is deactivated.

Preferably, the first micro DC/DC converter unit of the first DC/DC converter module and the second micro DC/DC converter unit of the second DC/DC converter module may be connected to the first low voltage system. In other words, the first low voltage system may receive electric power from the first high voltage system and/or the second high voltage system via the first micro DC/DC converter unit and/or the second micro DC/DC converter unit when the first main DC/DC converter unit is deactivated.

The control unit may be at least a part of an electric control unit (ECU) configured to perform a power conversion control. The control unit may comprise a digital signal processor (DSP) with a dedicated CAN communication interface.

The first micro DC/DC converter unit and the second micro DC/DC converter unit may be connected via a first bidirectional switch unit. The first bidirectional switch unit may comprise, for instance two switch elements arranged in a back-to-back position, i.e. in an opposite direction to each other. The switch elements may be a power semiconductor switch element such as an MOSFET or an IGBT. The switch elements may comprise a common source or common emitter configuration. Accordingly, the first bidirectional switch unit may block a current flowing in a reverse direction and perform a reverse-voltage protection.

Generally, the first bidirectional switch unit may be closed in a normal operation mode, in which the converter system has no failure and/or malfunction and the first main DC/DC converter unit is deactivated, to supply the electric power to the first low voltage system via the first micro DC/DC converter unit and/or the second micro DC/DC converter unit. Preferably, the first micro DC/DC converter unit may be configured to always transfer the electric power when the first main DC/DC converter unit is deactivated. In addition to the first micro DC/DC converter unit, the second micro DC/DC converter unit may also transfer the electric power if a power consumption demand of the first low voltage system exceeds a capacity of the first micro DC/DC converter unit.

In particular, if the power consumption demand of the first low voltage system exceeds a power limit of the first micro DC/DC converter unit, the first micro DC/DC converter unit may enter into a current limit mode. Meanwhile, an output low voltage level of the first micro DC/DC converter unit may reduce up to a low voltage set-point voltage of the second micro DC/DC converter unit. Accordingly, both of the first micro DC/DC converter unit and second micro DC/DC converter unit may supply the electric power together to the first low voltage system. In this way, a high efficiency of transferring electric power can be achieved in the parking state of the vehicle.

However, in case of a failure or a malfunction of the first micro DC/DC converter unit, the control unit may cause the first bidirectional switch unit to be opened to transfer the electric power from the second high voltage system to the first low voltage system via the second micro DC/DC converter unit. In other words, the second micro DC/DC converter unit may be disconnected from the failure, i.e. the first micro DC/DC converter unit and the first low voltage system may be supplied from second high voltage system via the second micro DC/DC converter unit of the second DC/DC converter module. Accordingly, a reliable power supply to the first low voltage system may be ensured even though an internal failure of the converter system.

In an example, the control unit is further configured to open the first bidirectional switch unit to transfer the electric power from the first high voltage system to the first low voltage system via the first micro DC/DC converter unit, if the first main DC/DC converter unit is deactivated and the second micro DC/DC converter unit has a failure. In case of the deactivated first main DC/DC converter unit, which may refer to the parking state of the vehicle, the first low voltage system may be configured to receive the electric power from the first high voltage system via the first micro DC/DC converter unit of the first DC/DC converter module and/or the second high voltage system via the second micro DC/DC converter unit of the second DC/DC converter module.

However, if the second micro DC/DC converter unit and/or the second DC/DC converter module has a failure, the control unit may cause the first bidirectional switch unit to be opened to transfer the electric power only from the first high voltage system to the first low voltage system via the first micro DC/DC converter unit. In other words, the first micro DC/DC converter unit may be disconnected from the failure, i.e. the second micro DC/DC converter unit and the first low voltage system may be supplied only from first high voltage system via the first micro DC/DC converter unit of the first DC/DC converter module. Meanwhile, power demand of the first low voltage system may be adapted to the capacity of the first micro DC/DC converter unit. Accordingly, a reliable power supply to the first low voltage system may be ensured even though an internal failure of the second micro DC/DC converter unit of the converter system.

In an example, the second micro DC/DC converter unit is further connectable to a second low voltage system. The control unit is configured to transfer the electric power from the first high voltage system to the second low voltage system via the first micro DC/DC converter unit. In other words, the converter system may be further configured to transfer the electric power to the second low voltage system in addition to the first low voltage system. The second low voltage system may be coupled with low voltage loads such as control components for opening a door or a window to open, starting the motor, steering and braking loads etc. as well. Some of the loads may be connected to both first and second low voltage systems and some of them are connected independently of first and second low voltage systems respectively. However, the second low voltage system may be configured to operate independently of first low voltage system.

The second low voltage system may be only coupled with the first micro DC/DC converter unit of the first DC-DC module and/or the second micro DC/DC converter unit of the second DC-DC module. Hence, the second low voltage system may be supplied with the electric power only via the first micro DC/DC converter unit and/or the second micro DC/DC converter unit independently of a state of the first main DC/DC converter unit, which may refer to the driving, charging or parking state of the vehicle.

The second low voltage system may also comprise a second low voltage interface ensuring a reliable connection between the first DC-DC module, particularly the first micro DC/DC converter unit and the second low voltage system and/or between the second DC/DC converter module, particularly the second micro DC/DC converter unit and the second low voltage system. Generally, the first bidirectional switch unit may be closed in a normal operation mode having no failure and/or malfunction of the converter system to supply the electric power from the first high voltage system to the first low voltage system and the second low voltage system via the first micro DC/DC converter unit.

In an example, the control unit is further configured to transfer the electric power from both of the first and second high voltage systems to each of the first and second low voltage system via the first micro DC/DC converter unit and the second micro DC/DC converter unit, if a sum of the electric power to be transferred to the first and second low voltage systems exceeds an available power of the first micro DC/DC converter unit.

Preferably, the first micro DC/DC converter unit may be configured to transfer the electric power always. In addition to the first micro DC/DC converter unit, the second micro DC/DC converter unit may also transfer the electric power to the first low voltage system and the second low voltage system if the sum of the power consumption demand of the first low voltage system and the second low voltage system exceeds a capacity of the first micro DC/DC converter unit.

In particular, if the sum of the power consumption demand of the first low voltage system and the second low voltage system exceeds a power limit of the first micro DC/DC converter unit, the first micro DC/DC converter unit may enter into a current limit mode. Meanwhile, an output low voltage level of the first micro DC/DC converter unit may reduce up to a low voltage set-point voltage of the second micro DC/DC converter unit. Accordingly, both of the first micro DC/DC converter unit and second micro DC/DC converter unit may supply the electric power together to the first low voltage system and the second low voltage system. In this way, a high efficiency of transferring electric power can be achieved in the parking state of the vehicle.

In an example, the control unit is further configured to deactivate the second low voltage system, if the first main DC/DC converter unit is deactivated and the second micro DC/DC converter unit has a failure. If the second micro DC/DC converter unit has a failure, the control unit may cause the first bidirectional switch unit connecting the first micro DC/DC converter unit and the second micro DC/DC converter unit to be opened to disconnect the first micro DC/DC converter unit from the failure, i.e. the second micro DC/DC converter unit.

Accordingly, the second low voltage system may be disconnected from the first micro DC/DC converter unit and only coupled with the second micro DC/DC converter unit having the failure. To avoid further failure or malfunction, the control unit may disable the second low voltage system. Hence, the second low voltage system may not comprise any essential low voltage loads, which may be deactivated in case of a failure of the second micro DC/DC converter unit. However, the electric power supply to the first low voltage system may be continued from the first high voltage system via the first micro DC/DC converter unit.

In an example, the second DC/DC converter module further comprises a second main DC/DC converter unit. The second main DC/DC converter unit is connectable at least to the first low voltage system. The second main DC/DC converter unit may be configured to transfer the electric power from the second high voltage system to the first low voltage system. The second main DC/DC converter unit may be designed to provide high power, for instance in a range of 3 kW to 4 kW, when activated, which may refer to the driving and/or charging state of the vehicle. Accordingly, if the first main DC/DC converter unit fails during driving or charging the vehicle, the first low voltage system may be supplied from the second high voltage system via the second main DC/DC converter unit.

In an example, the first low voltage system may be coupled with each of the first main DC/DC converter unit, the first micro DC/DC converter unit, the second main DC/DC converter unit and the second micro DC/DC converter unit to continuously transfer the electric power to the first low voltage system. For instance, the first low voltage system may receive the electric power from the first and/or the second high voltage system even if at least one of the first main DC/DC converter unit, the first micro DC/DC converter unit, the second main DC/DC converter unit and the second micro DC/DC converter unit fails. Moreover, the first low voltage system may be reliably supplied regardless the first and the second main DC/DC converter unit activated, e.g. during driving or charging the vehicle or not, e.g. during the parking state of the vehicle.

In an example, the converter system may further comprise three or more DC/DC converter modules and the first low voltage system may be coupled with three or more main DC/DC converter units and/or three or more micro DC/DC converter units to ensure a reliable power supply to the first low voltage system even an single point failure in the converter system.

In an example, the first low voltage system comprises at least a first low voltage load and a second low voltage load. A first single switch element is arranged between the first low voltage load and the first micro DC/DC converter unit. A second single switch element is arranged between the second low voltage load and the first micro DC/DC converter unit. The control unit is configured to open the first single switch element, if the first main DC/DC converter unit is deactivated and the first low voltage load has a failure.

The first low voltage system may comprise one or more low voltage loads. Each low voltage load may be individually coupled with each of the first main DC/DC converter unit and the first micro DC/DC converter unit. Between each low voltage load and the first main DC/DC converter unit and/or between each low voltage load and the first micro DC/DC converter unit, a single switch element may be arranged to switch a transfer of the electric power from the first high voltage system to the respective low voltage load. In particular, the first single switch element may be arranged between an output side of the first micro DC/DC converter unit and an input side of the first low voltage load. Likewise, the second single switch element may be arranged between the output side of the first micro DC/DC converter unit and an input side of the second low voltage load.

For instance, if the first main DC/DC converter unit is activated, the first low voltage load and the second low voltage load may be supplied from the first high voltage system via the first main DC/DC converter unit. However, if the first main DC/DC converter unit is deactivated, the first single switch element and the second switch element may be closed and the first low voltage load and the second low voltage load may be supplied from the first high voltage system via the first micro DC/DC converter unit.

If any one of the first low voltage load or the second low voltage load has a failure, the control unit may cause the single switch element arranged at the respective low voltage load to be opened to disconnect the low voltage load having a malfunction or failure. Accordingly, even a failure inside the first low voltage system, a reliable transfer of the electric power to the functioning low voltage load(s) may be ensured. Additionally, the electric power may be also transferred to the second low voltage system via the first micro DC/DC converter unit and the first bidirectional switch unit, if the first micro DC/DC converter unit does not fail.

In an example, the second low voltage system may comprise third low voltage load and a third single switch element. The third single switch element may be arranged between the output side of the first and second micro DC/DC converter unit and the third low voltage load of the second low voltage system. In case of a failure of the third low voltage load, the control unit may cause the third single switch element to be opened to disconnect the third low voltage load with the failure.

In an example, the control unit is configured to transfer a high current from the first main DC/DC converter unit to the first micro DC/DC converter unit via the first single switch element and/or the second single switch element, if the first main DC/DC converter unit is activated and the first micro DC/DC converter unit has a failure. While the first main DC/DC converter unit is activated, a failure such as a short circuit may occur at the first micro DC/DC converter unit. In such a case, the control unit may cause the first main DC/DC converter unit to transfer a high current to the first micro DC/DC converter unit via the first single switch element arranged at the first low voltage load and/or the second single switch element arranged at the second low voltage load.

The first single switch element and/or the second single switch element connected to the output side of the first micro DC/DC converter unit may be rated for a less current compared to the first main DC/DC converter unit. Accordingly, the first single switch element and/or the second single switch element may fail and isolate the first micro DC/DC converter unit from the first main DC/DC converter unit if the first main DC/DC converter unit is activated.

Meanwhile, the second main DC/DC converter unit may transfer the electric power from the second high voltage system to the first low voltage system, i.e. first low voltage load and/or second low voltage load, and the second low voltage system. If the first main DC/DC converter unit and the second main DC/DC converter unit are deactivated, the second micro DC/DC converter unit may continue to supply the electric power from the second high voltage system to the first and/or second low voltage system.

In an example, the converter system further comprises a second bidirectional switch unit and a third bidirectional switch unit. The second bidirectional switch unit is arranged between the second micro DC/DC converter unit and the first low voltage load and the third bidirectional switch unit is arranged between the second micro DC/DC converter unit and the second low voltage load. The control unit is configured to transfer a high current from the second main DC/DC converter unit to the second micro DC/DC converter unit via the second bidirectional switch unit and/or the third bidirectional switch unit, if the first main DC/DC converter unit is activated and the second micro DC/DC converter unit has a failure.

While the first main DC/DC converter unit and the second main DC/DC converter unit are activated, a short circuit may occur at the second micro DC/DC converter unit. In such a case, the control unit may cause the second main DC/DC converter unit to transfer a high current to the second bidirectional switch unit arranged between an output side of the second micro DC/DC converter unit and the first low voltage load of the first low voltage system. Additionally or alternatively, the control unit may cause the second main DC/DC converter unit to transfer a high current to the third bidirectional switch unit arranged between an output side of the second micro DC/DC converter unit and the second low voltage load of the first low voltage system.

As soon as the second bidirectional switch unit and/or the third bidirectional switch unit detects the current in both direction, i.e. from the second micro DC/DC converter unit and from the second main DC/DC converter unit, the second bidirectional switch unit and/or the third bidirectional switch unit may be opened. Particularly, the second bidirectional switch unit and/or the third bidirectional switch unit may be turned off if the current exceeds an over current threshold. Accordingly, the second micro DC/DC converter unit with a failure may be disconnected from the second main DC/DC converter unit.

Meanwhile, the control unit is configured to cause the first main DC/DC converter unit to supply the electric power to the first low voltage load and the second low voltage load. If the first main DC/DC converter unit is deactivated, the first micro DC/DC converter unit may supply the electric power to the first low voltage system via the first single switch element and the second low voltage load via the second single switch element. Further, the first bidirectional switch unit may be opened to separate the first micro DC/DC converter unit from the second micro DC/DC converter unit having failure. Additionally or alternatively, the second low voltage system may be powered off due to the failure of the second micro DC/DC converter unit and high current transferred at the output side of the second micro DC/DC converter unit.

In an example, the first main DC/DC converter unit and the second main DC/DC converter unit are configured to provide higher electric power than the first micro DC/DC converter unit and the second micro DC/DC converter unit. For instance, the first main DC/DC converter unit and the second main DC/DC converter unit may be configured to provide high power in a range of 3 kW to 4 kW. In contrast, the first micro DC/DC converter unit and the second micro DC/DC converter unit may be configured to provide a low power in the range from 50 W to 200 W.

Accordingly, if the converter system is integrated in a vehicle, the first main DC/DC converter unit and the second main DC/DC converter unit may be activated during driving or charging the vehicle and the first low voltage system may be supplied via the first main DC/DC converter unit and/or the second main DC/DC converter unit. Further, the first main DC/DC converter unit and the second main DC/DC converter unit may be turned off when the vehicle is parked and the first low voltage system may be supplied via the first micro DC/DC converter unit and/or the second micro DC/DC converter unit.

In an example, the first micro DC/DC converter unit is configured to provide a lower electric power than the second micro DC/DC converter unit. The first micro DC/DC converter unit and the second micro DC/DC converter unit may be configured to provide two different power levels with two different low voltage set point. The set point may be adjusted to protect the first and second micro DC/DC converter units from an output overvoltage. For instance, the first micro DC/DC converter unit may be configured to provide lower power, e.g. 50 W with a low voltage set point of 15 V compared to the second micro DC/DC converter unit, e.g. 200 W with a low voltage set point of 14.5 V to improve the efficiency of the electric power transfer.

The first bidirectional switch unit may be arranged between the output side of the first micro DC/DC converter unit and the output side of the second micro DC/DC converter unit. If there is no fault in the converter system, the first bidirectional switch unit may be always closed such that both of the first low voltage system and the second low voltage system may be supplied by the first micro DC/DC converter unit if total power consumption demand is less than a predefined power of the first micro DC/DC converter unit. However, if the sum of the power consumption demand of the first and low voltage systems exceeds the predefined power of the first micro DC/DC converter unit, the control unit may cause the first micro DC/DC converter unit to reduce its low voltage set point up to the low voltage set point of the second micro DC/DC converter unit by entering in a current limit mode. Subsequently, both of the first micro DC/DC converter unit and the second micro DC/DC converter unit may supply the first and second low voltage system together. Hence, the efficiency of the electric power transfer may be improved.

In an example, each of the first, the second and the third bidirectional switch units comprises a pair of MOSFET elements and each of the first and second single switch elements comprising a smart FET element. The bidirectional switch units may be configured to block a current flowing in a reverse direction and perform a reverse-voltage protection. The single switch element may be configured to allow a power transfer and/or current flow by opening or closing.

The bidirectional switch unit may comprise a pair of power semiconductor switch element such as MOSFET (Metal-Oxide-Semiconductor Field-Effect Transistor) arranged in series back-to-back (B2B). Such semiconductor switch element does not have no mechanical moving parts. Thus, they may have very less failure, very less power/ switching loss, fast response time of an opening and/or a closing of the switches compared to relays and long life. Accordingly, the first, the second and the third bidirectional switch units may allow a high efficient power switching. Alternatively, the first bidirectional switch unit, the second bidirectional switch unit and/or the third bidirectional switch unit may comprise a Bipolar-Junction Transistor (BJT), an Insulated-Gate Bipolar Transistor (IGBT) or a Thyristors (SCR, GTO, MCT).

The single switch element may comprise one smart FET (Field-Effect Transistor) element with a diagnosis and/or protection availability. Each single switch element arranged between the main DC/DC converter unit and the low voltage system and/or between the micro DC/DC converter unit and the low voltage system may be also replaced by the bidirectional switch unit comprising a pair of power semiconductor switch element.

According to the present disclosure, a vehicle is presented. The vehicle comprises a converter system as described above. The vehicle is a battery electric vehicle or a hybrid electric vehicle. The converter system may allow a reliable power transfer between a high voltage system and a low voltage system in any state of the vehicle even a single point fault failure in the converter system. In other words, the converter system may fulfil ASIL D in order to ensure the power supply availability to low voltages loads with a high efficiency in case of any single point of failure. Accordingly, the vehicle may not require any low voltage energy storage system such as 12V lead acid, 12V Li-ion or super capacitor to provide low voltage power to the low voltage system(s) of the vehicle.

In an example, if a first main DC/DC converter unit and/or a second main DC/DC converter unit is deactivated, the vehicle is in a parking state and if the first main DC/DC converter unit and/or the second main DC/DC converter unit is activated, the vehicle is in a driving and/or charging mode. Since the first main DC/DC converter unit and/or a second main DC/DC converter unit may be configured to provide high power, they may be activated during driving or charging the vehicle. To increase energy efficiency, however, the first main DC/DC converter unit and a second main DC/DC converter may be deactivated when the vehicle is in a parking state. The first low voltage system, which should be always turned on independently of the state of the vehicle, may be supplied via the first micro DC/DC converter unit and/or a second micro DC/DC converter unit.

According to the present disclosure, a method for transferring electric power is presented. The method comprises, but not necessarily in this order:
  transferring the electric power from a first high voltage system to a first low voltage system via a first micro DC/DC converter unit if a first main DC/DC converter unit is deactivated, and
  opening a first bidirectional switch unit to transfer the electric power from a second high voltage system to the first low voltage system via a second micro DC/DC converter unit, if the first main DC/DC converter unit is deactivated and the first micro DC/DC converter unit has a failure.

A first DC/DC converter module is connectable to the first high voltage system and at least to the first low voltage system. A second DC/DC converter module is connectable to the second high voltage system and at least to the first low voltage system. The first DC/DC converter module comprises at least the first main DC/DC converter unit and the first micro DC/DC converter unit. The second DC/DC converter module comprises at least the second micro DC/DC converter unit. The first micro DC/DC converter unit and the second micro DC/DC converter unit are connectable via the first bidirectional switch unit.

According to the present disclosure, a computer program element may be presented. The computer program element may be configured for a converter system as described above. The program element is adapted to perform the method steps as described above, when being executed by a processing element.

It should be noted that the above examples may be combined with each other irrespective of the aspect involved. Accordingly, the method may be combined with structural features and, likewise, the system may be combined with features described above with regard to the method.

These and other aspects of the present examples will become apparent from and elucidated with reference to the examples described hereinafter.

BRIEF DESCRIPTION OF DRAWINGS

Examples according to the present disclosure will be described in the following with reference to the following drawings.

DESCRIPTION OF EXAMPLES

Figure 1:
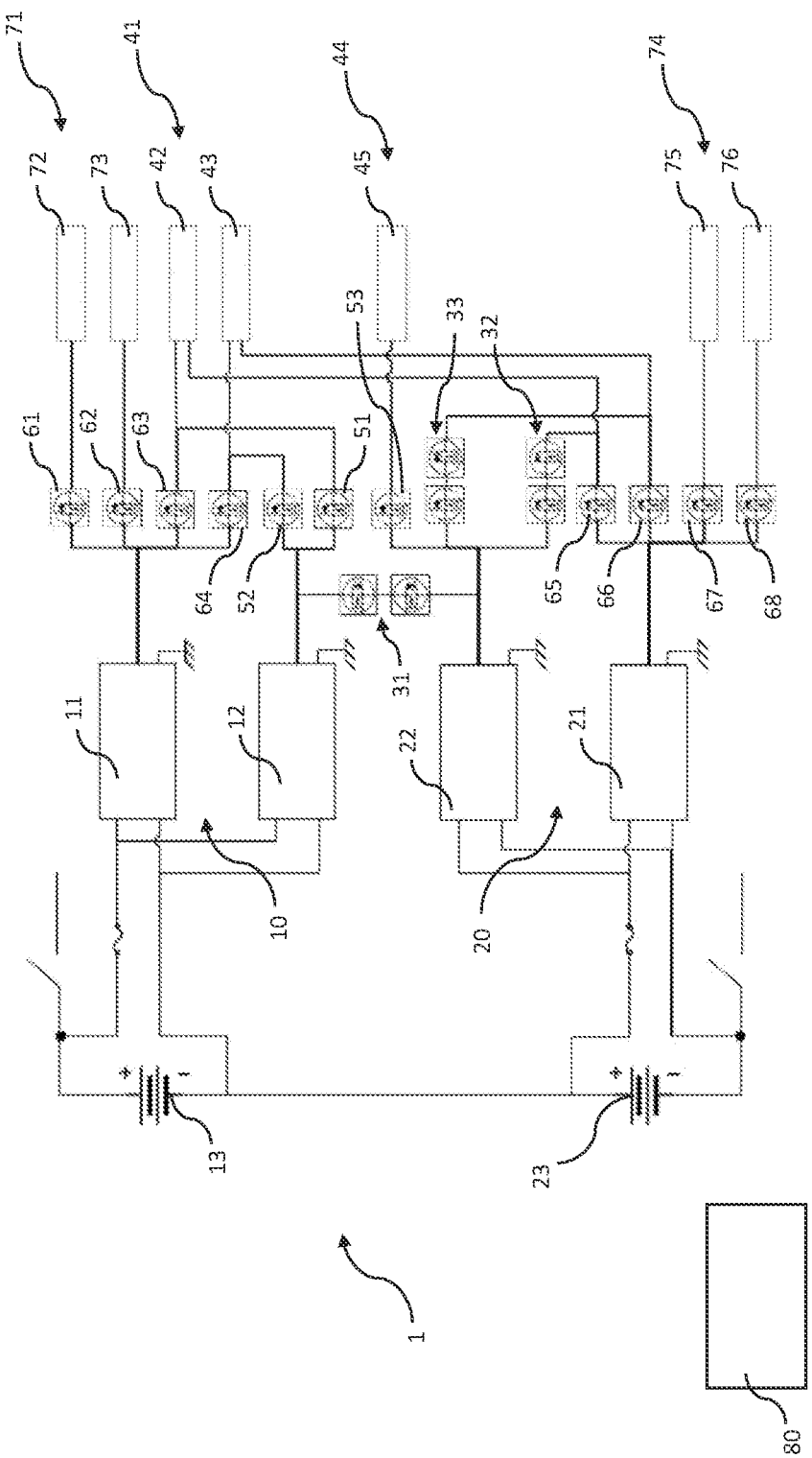
FIG. 1 shows schematically and exemplarily an example of a converter system according to the present disclosure.

FIG. 1 shows a converter system 1 for transferring electric power from a high voltage system to a low voltage system. Such a converter system 1 may be integrated in a vehicle, particularly in a battery electric vehicle and/or a hybrid electric vehicle. The high voltage system may be a high voltage energy storage system, which provides several hundreds of volts as an energy source for operating the vehicle. The high voltage system may provide a voltage of 400V or 800V. However, an inlet voltage of the high voltage system may vary depending on the configuration of the high voltage system.

The low voltage system may comprise one or more low voltage loads such as control components for opening a door or a window to open, starting the motor, steering and braking loads etc. The converter system 1 may allow a reliable power transfer between the high voltage system and the low voltage system in any state of the vehicle even a single point failure in the converter system 1. In other words, the converter system 1 may fulfil ASIL D in order to ensure a power supply availability to low voltages loads with a high efficiency in case of any single point of failure. Accordingly, the vehicle may not require any low voltage energy storage system such as 12V lead acid, 12V Li-ion or super capacitor to provide low voltage power to the low voltage system(s) of the vehicle.

The converter system 1 comprises a first DC/DC converter module 10, a second DC/DC converter module 20 and a control unit 80. The control unit 80 may be at least a part of an electric control unit (ECU) configured to perform a power conversion control. The first DC/DC converter module 10 is connectable to a first high voltage system 13 and the second DC/DC converter module 20 is connectable to a second high voltage system 23. Each of the first high voltage system 13 and the second high voltage system 23 may comprise a high voltage interface to be connected to each of the first DC/DC converter module 10 and the second DC/DC converter module 20. The first high voltage system 13 and the second high voltage system 23 may be the same or different high voltage system.

The first DC/DC converter module 10 is further connectable to a first low voltage system 41 and a third low voltage system 71. Thus, the first DC/DC converter module 10 is configured to transfer the electric power from the first high voltage system 13 to the first low voltage system 41 and the third low voltage system 71. The second DC/DC converter module 20 is further connectable to the first low voltage system 41, a second low voltage system 44 and a fourth low voltage system 74. Thus, the second DC/DC converter module 20 is configured to transfer the electric power from the second high voltage system 23 to the first low voltage system 41, the second low voltage system 44 and the fourth low voltage system 74.

The first DC/DC converter module 10 comprises a first main DC/DC converter unit 11 and a first micro DC/DC converter unit 12. The second DC/DC converter module 20 comprises a second main DC/DC converter unit 21 and a second micro DC/DC converter unit 22. The first main DC/DC converter unit 11 and the second main DC/DC converter unit 21 are configured to provide higher electric power than the first micro DC/DC converter unit 12 and the second micro DC/DC converter unit 22. Further, the first micro DC/DC converter unit 12 is configured to provide a lower electric power than the second micro DC/DC converter unit 22.

Each low voltage system may comprise one or more low voltage loads. Each of the first main DC/DC converter unit 11, the second main DC/DC converter unit 21, the first micro DC/DC converter unit 12 and the second micro DC/DC converter unit 22 is individually connectable to each of the low voltage loads of each low voltage system. Each low voltage load may comprise an individual low voltage interface ensuring a reliable connection to the first main DC/DC converter unit 11, the second main DC/DC converter unit 21, the first micro DC/DC converter unit 12 and the second micro DC/DC converter unit 22.

Accordingly, a first low voltage load 42 of the first low voltage system 41 can be connected to the first micro DC/DC converter unit 12 via a first single switch element 51 and a second low voltage load 43 of the first low voltage system 41 can be connected to the first micro DC/DC converter unit 12 via a second single switch element 52. Further, the third low voltage load 45 of the second low voltage system 44 can be connected to the second micro DC/DC converter unit 22 via a third single switch element 53.

The first main DC/DC converter unit 11 is connectable to a fourth low voltage load 72 of the third low voltage system 71 via a fourth single switch element 61 and to a fifth low voltage load 73 of the third low voltage system 71 via a fifth single switch element 62. The second main DC/DC converter unit 21 is connectable to a sixth low voltage load 75 of the fourth low voltage system 74 via a sixth single switch element 67 and to a seventh low voltage load 76 of the fourth low voltage system 74 via a seventh single switch element 68.

Further, the first main DC/DC converter unit 11 is connectable to the first low voltage load 42 of the first low voltage system 41 via the eighth single switch element 63 and to the second low voltage load 43 of the first low voltage system 41 via the ninth single switch element 64. In addition, the second main DC/DC converter unit 21 is connectable to the first low voltage load 42 of the first low voltage system 41 via the tenth single switch element 65 and to the second low voltage load 43 of the first low voltage system 41 via the eleventh single switch element 66. The single switch elements are configured to allow a power transfer and/or current flow by opening or closing. Each single switch element may comprise a smart FET element.

The first micro DC/DC converter unit 12 and the second micro DC/DC converter unit 22 are connectable via a first bidirectional switch unit 31. The second micro DC/DC converter unit 22 can be connected to the first low voltage load 42 via a second bidirectional switch unit 32 and to the second low voltage load 43 via a third bidirectional switch unit 33. In other words, the first low voltage load 42 and the second low voltage load 43 of the first low voltage system 41 can be connected to both of the first DC/DC converter module 10 and the second DC/DC converter module 20. Accordingly, the first low voltage system 41 can be connected to all of the first main DC/DC converter unit 11, the second main DC/DC converter unit 21, the first micro DC/DC converter unit 12 and the second micro DC/DC converter unit 22 to ensure a reliable power supply to the first low voltage system 41 in any state of the vehicle, i.e. driving, charging and parking.

The bidirectional switch units 31, 32, 33 may be configured to block a current flowing in a reverse direction and perform a reverse-voltage protection. Each bidirectional switch unit may comprise a pair of power semiconductor switch element such as MOSFET (Metal-Oxide-Semiconductor Field-Effect Transistor) arranged in series back-to-back (B2B).

Since the first main DC/DC converter unit 11 and a second main DC/DC converter unit 21 are configured to provide high power, they may be activated during driving or charging the vehicle to transfer the electric power from the first high voltage system 13 and the second high voltage system 23 to the respective low voltage load. However, if the vehicle is in a parking state, the first main DC/DC converter unit 11 and a second main DC/DC converter unit 21 are turned off and the first micro DC/DC converter unit 12 and/or a second micro DC/DC converter unit 22 transfers the electric power from the first high voltage system 13 and/or the second high voltage system 23 to the respective low voltage load.

The first micro DC/DC converter unit 12 and the second micro DC/DC converter unit 22 may be configured to provide two different power levels with two different low voltage set point. Accordingly, if there is no fault in the converter system 1, the first bidirectional switch unit 31 is always closed to transfer the electric power to both of the first low voltage system 41 and the second low voltage system 44 via the first micro DC/DC converter unit 12 as long as a sum of both power consumption demand is less than an energy capacity of the first micro DC/DC converter unit 12. However, if the sum of the power consumption demand of the first low voltage system 41 and the second low voltage system 44 exceeds the energy capacity of the first micro DC/DC converter unit 12, the second micro DC/DC converter unit 22 transfers additionally the electric power to the first low voltage system 41 and the second low voltage system 44 as well.

The third low voltage system 71 and the fourth low voltage system 74 may configured to be supplied with the electric power only if the first main DC/DC converter unit 11 and the second main DC/DC converter unit 21 are activated.

Figure 2:
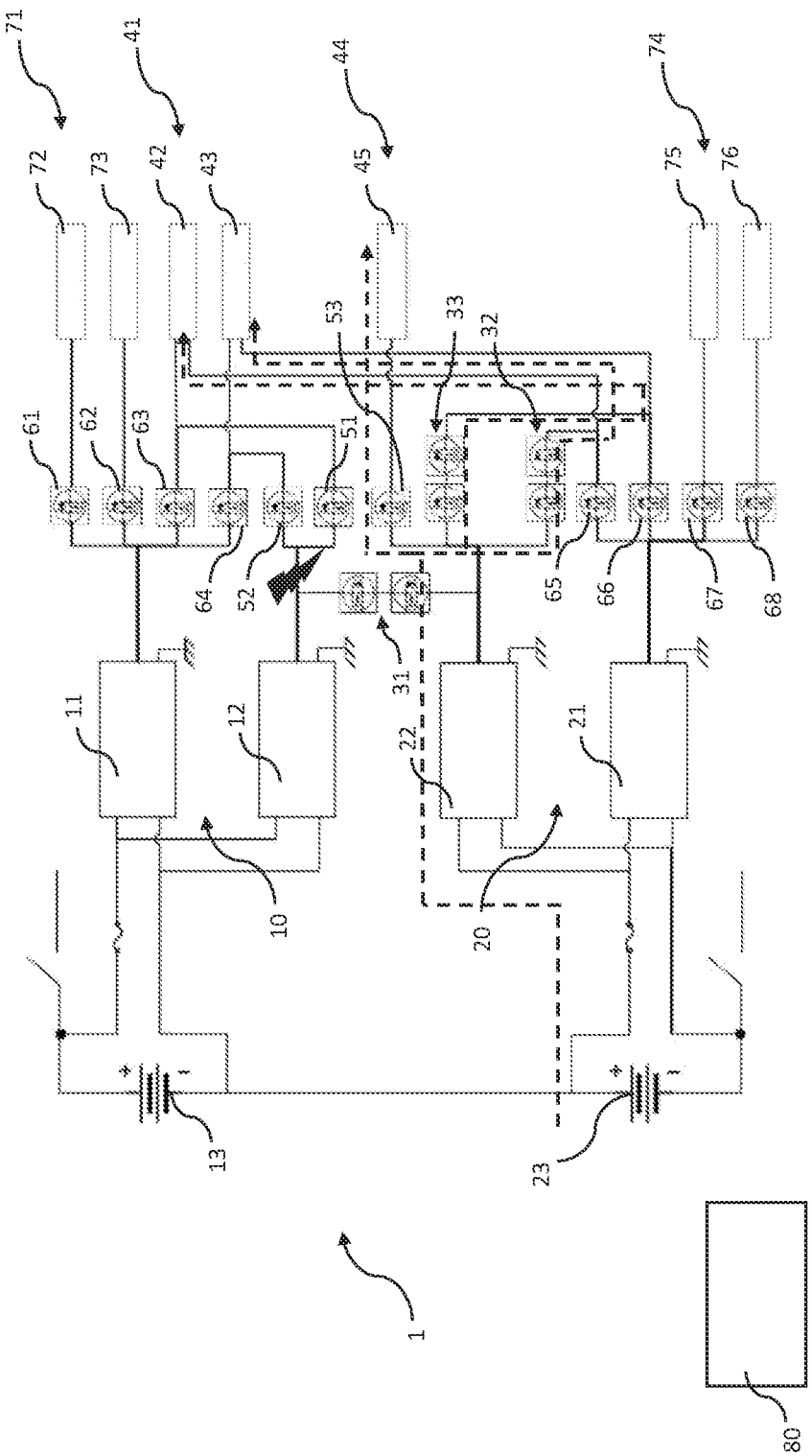
FIG. 2 shows schematically and exemplarily an example of a converter system according to the present disclosure.

FIG. 2 shows an example, in which the first and second main DC/DC converter units 11, 21 are deactivated, i.e. the parking state of the vehicle, and the first micro DC/DC converter unit 12 has a failure. In such case, the control unit 80 is configured to open the first bidirectional switch unit 31 to disconnect the second micro DC/DC converter unit 22 from the failure and transfer the electric power from the second high voltage system 23 to the first low voltage system 41 via the second micro DC/DC converter unit 22.

In particular, the first low voltage load 42 of the first low voltage system 41 is supplied via the second bidirectional switch unit 32 and the second low voltage load 43 of the first low voltage system 41 is supplied via the third bidirectional switch unit 33. Further, the third low voltage load 45 of the second low voltage system 44 is supplied from the second high voltage system 23 via the second micro DC/DC converter unit 22 and third single switch element 53.

Figure 3:
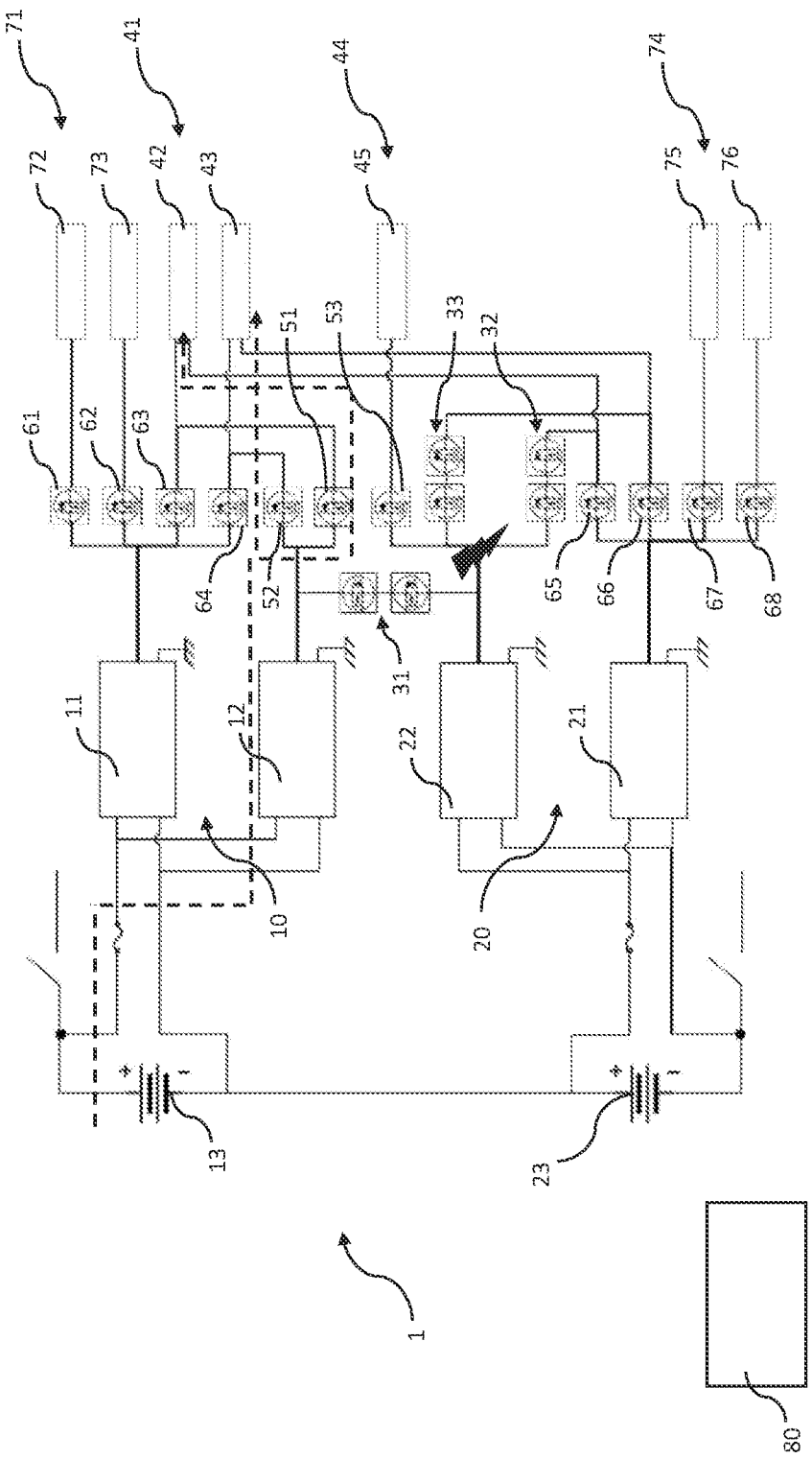
FIG. 3 shows schematically and exemplarily an example of a converter system according to the present disclosure.

FIG. 3 shows an example, in which the first and second main DC/DC converter units 11, 21 are deactivated, i.e. the parking state of the vehicle, and the second micro DC/DC converter unit 22 has a failure. In such case, the control unit 80 is configured to open the first bidirectional switch unit 31 to disconnect the first micro DC/DC converter unit 12 from the failure and transfer the electric power from the first high voltage system 13 to the first low voltage system 41 via the first micro DC/DC converter unit 12.

In particular, the first low voltage load 42 of the first low voltage system 41 is supplied via the first single switch element 51 and the second low voltage load 43 of the first low voltage system 41 is supplied via the second single switch element 52. Since the first bidirectional switch unit 31 is opened however, the second low voltage system 44, which otherwise only connected to the second micro DC/DC converter unit 22, cannot be powered. Accordingly, the second low voltage system 44 may be selected such that its low voltage load(s) is not an essential component to operate the vehicle and its power consumption is very low during all state of the vehicle, i.e. driving, charging and parking.

Figure 4:
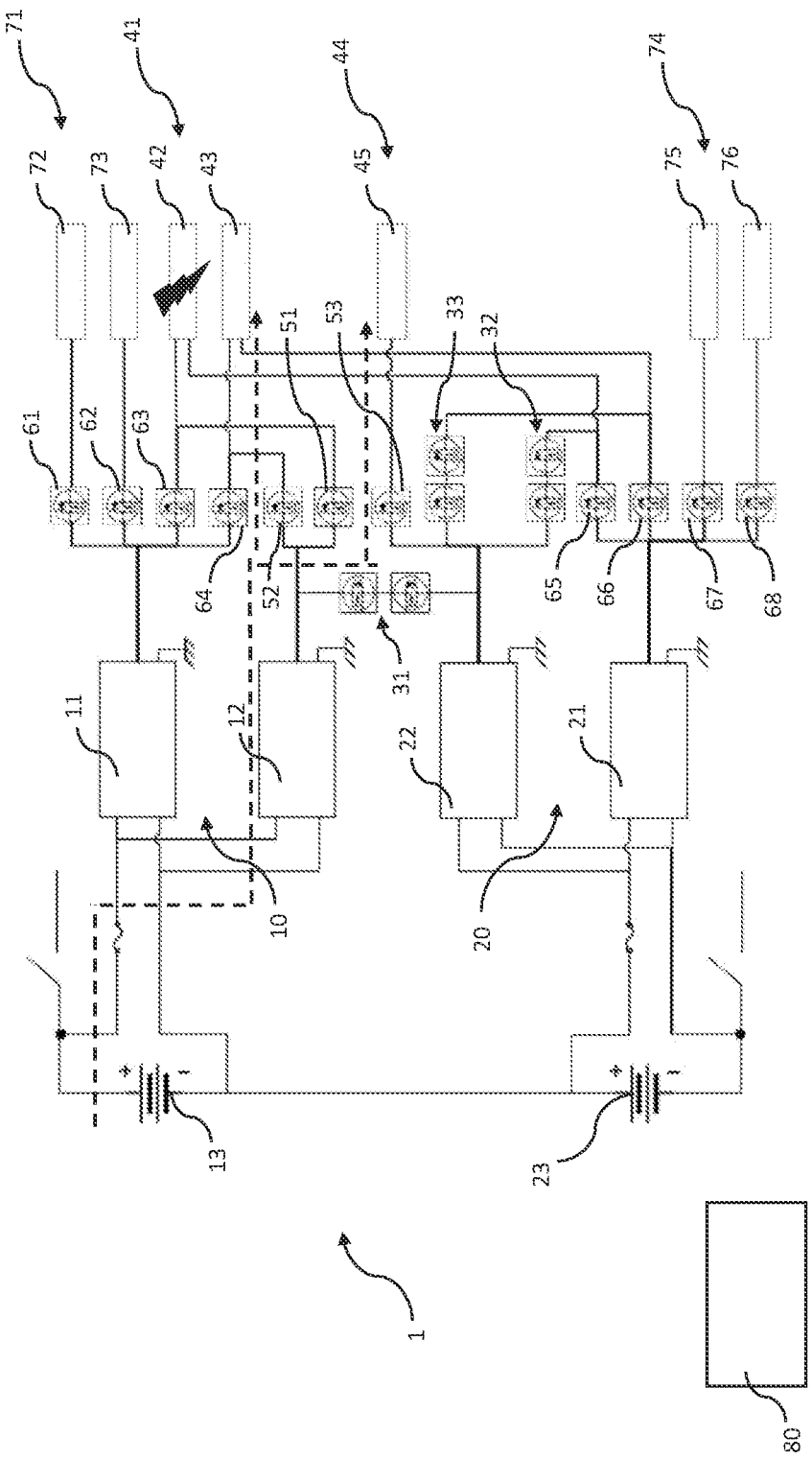
FIG. 4 shows schematically and exemplarily an example of a converter system according to the present disclosure.

FIG. 4 shows an example, in which the first low voltage load 42 of the first low voltage system 41 has a failure. This example applies to both cases, i.e. the first and second main DC/DC converter units 11, 21 are deactivated, i.e. the parking state of the vehicle, or the first and second main DC/DC converter units 11, 21 are activated, i.e. driving or charging state of the vehicle. In such case, the control unit 80 is configured to open the first single switch element 51 to disconnect the first micro DC/DC converter unit 12 from the failure and transfer the electric power from the first high voltage system 13 to the second low voltage load 43 via the first micro DC/DC converter unit 12 and the second single switch element 52.

Further, the first bidirectional switch unit 31 remains closed to transfer the electric power from the first high voltage system 13 to the second low voltage system 44, i.e. the third low voltage load 45, via the first micro DC/DC converter unit 12 and the third single switch element 53, if the sum of the power consumption demand of the second low voltage load 43 and the third low voltage load 45 is less than a power availability of the first micro DC/DC converter unit 12. If the sum exceeds the power availability of the first micro DC/DC converter unit 12, the control unit 80 may cause the second micro DC/DC converter unit 22 to additionally transfer the electric power from the second high voltage system 23 to the second low voltage load 43 of the first low voltage system 41 via the second bidirectional switch unit 32 and to the third low voltage load 45 of the second low voltage system 44 via the third single switch element 53.

Figure 5:
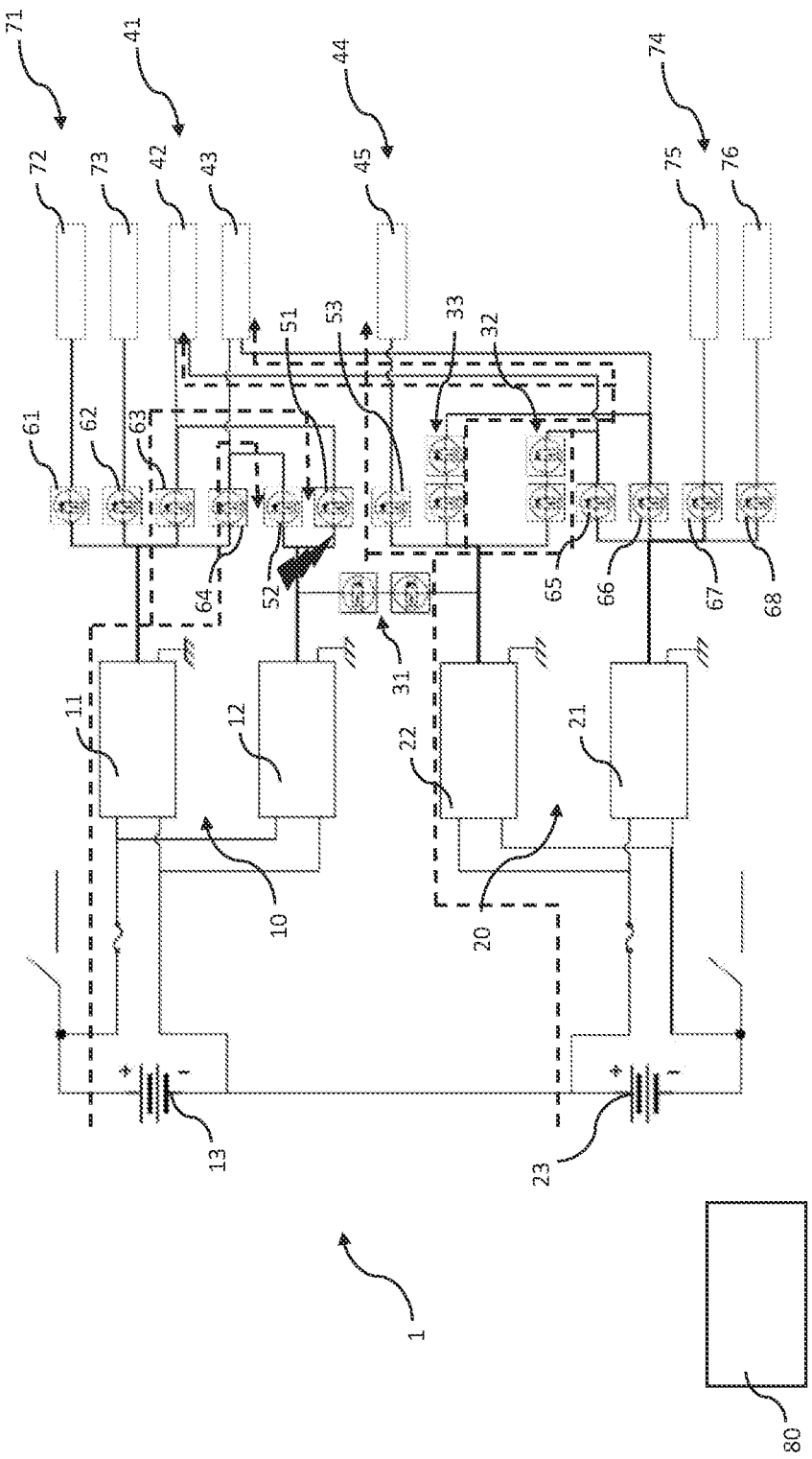
FIG. 5 shows schematically and exemplarily an example of a converter system according to the present disclosure.

FIG. 5 shows an example, in which the first and second main DC/DC converter units 11, 21 are activated, i.e. the driving or charging state of the vehicle, and first micro DC/DC converter unit 12 has a failure. The failure can be, for instance a short circuit. In such case, the control unit 80 is configured to transfer a high current from the first main DC/DC converter unit 11 to the first micro DC/DC converter unit 12 via the first single switch element 51 and the second single switch element 52 to disconnect the first micro DC/DC converter unit 12.

The first single switch element 51 and/or the second single switch element 52 connected to the output side of the first micro DC/DC converter unit 12 may be rated for a less current compared to the first main DC/DC converter unit 11. Accordingly, the first single switch element 51 and/or the second single switch element 52 may fail due to the high current sent from the first main DC/DC converter unit 11 and isolate the first micro DC/DC converter unit 12 from the first main DC/DC converter unit 11.

Meanwhile, the second main DC/DC converter unit 21 is configured to transfer the electric power from the second high voltage system 23 to the first low voltage load 42 via the tenth single switch element 65 and the second low voltage load 43 via the tenth single switch element 66 during driving or charging the vehicle. Additionally, the third low voltage load 45 is supplied via the second micro DC/DC converter unit 22 and the third single switch element 53.

If the first main DC/DC converter unit 11 and the main DC/DC converter unit 21 are deactivated, the second micro DC/DC converter unit 22 is configured to transfer the electric power from the second high voltage system 23 to the first low voltage load 42 via the second bidirectional switch unit 32, the second low voltage load 43 via the third bidirectional switch unit 33, and the third low voltage load 45 via the third single switch element 53. Thus, despite the failure of the first micro DC/DC converter unit 12, the second micro DC/DC converter unit 22 may continue to supply the electric power from the second high voltage system 23 to the first and/or second low voltage system 44.

Figure 6:
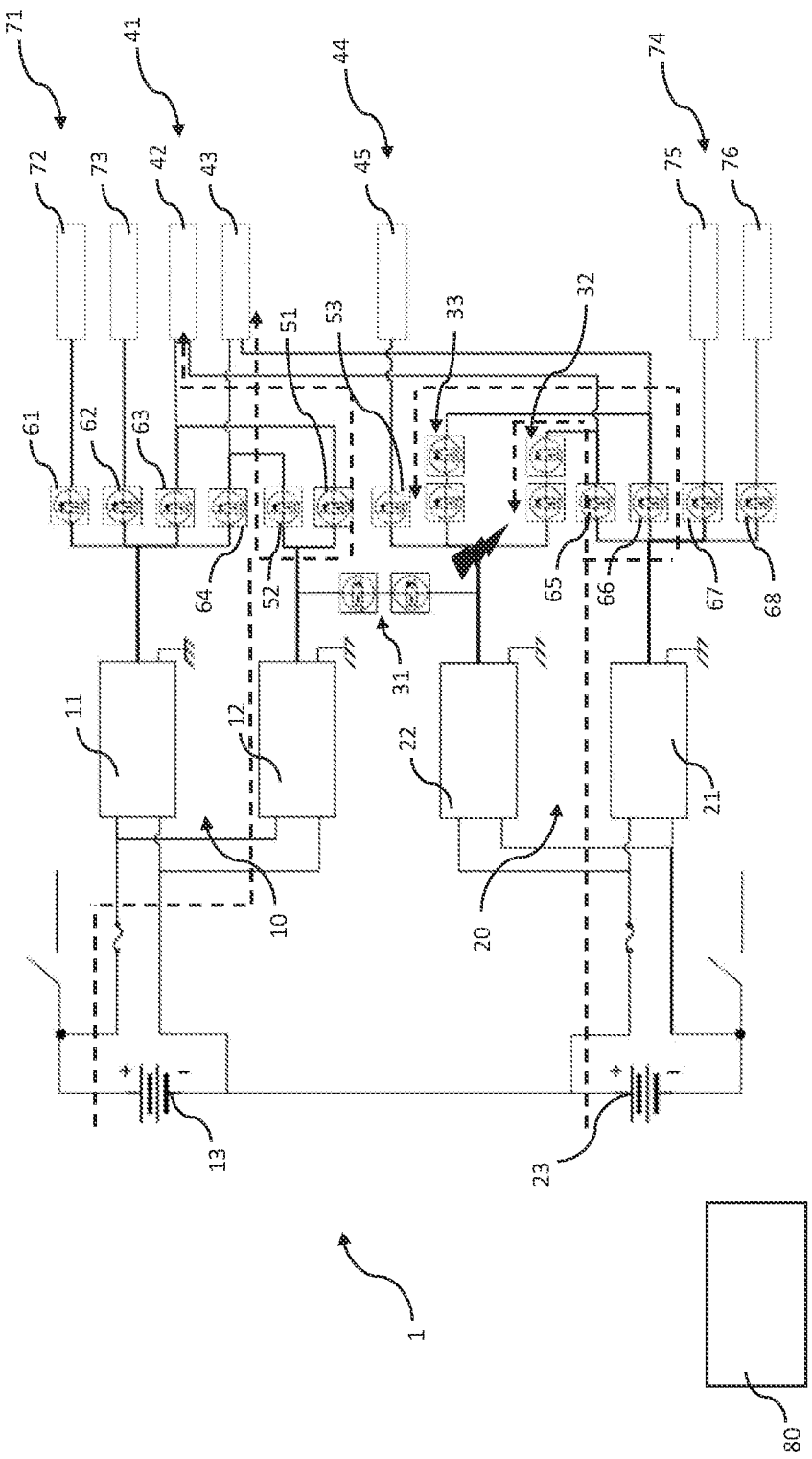
FIG. 6 shows schematically and exemplarily an example of a converter system according to the present disclosure.

FIG. 6 shows an example, in which the first and second main DC/DC converter units 11, 21 are activated, i.e. the driving or charging state of the vehicle, and second micro DC/DC converter unit 22 has a failure. The failure can be, for instance a short circuit. In such case, the control unit 80 is configured to transfer a high current from the second main DC/DC converter unit 21 to the second micro DC/DC converter unit 22 via the second bidirectional switch unit 32 and the third bidirectional switch unit 33 to disconnect the second micro DC/DC converter unit 22.

In particular, the control unit 80 may cause the second main DC/DC converter unit 21 to transfer a high current to the second bidirectional switch unit 32 arranged between an output side of the second micro DC/DC converter unit 22 and the first low voltage load 42 of the first low voltage system 41. Additionally or alternatively, the control unit 80 may cause the second main DC/DC converter unit 21 to transfer a high current to the third bidirectional switch unit 33 arranged between an output side of the second micro DC/DC converter unit 22 and the second low voltage load 43 of the first low voltage system 41.

As soon as the second bidirectional switch unit 32 and/or the third bidirectional switch unit 33 detects the current in both direction, i.e. from the second micro DC/DC converter unit 22 and from the second main DC/DC converter unit 21, the second bidirectional switch unit 32 and/or the third bidirectional switch unit 33 can be opened. Accordingly, the second micro DC/DC converter unit 22 with a failure may be disconnected from the first and second low voltage systems 41, 42.

Meanwhile, the first main DC/DC converter unit 11 is configured to transfer the electric power from the first high voltage system 13 to the first low voltage load 42 via the eighth single switch element 63 and the second low voltage load 43 via the ninth single switch element 64 during driving or charging the vehicle. However, the second low voltage system 44 is powered off due to the failure of the second micro DC/DC converter unit 22 and high current transferred at the output side of the second micro DC/DC converter unit 22.

If the first main DC/DC converter unit 11 and the main DC/DC converter unit 21 are deactivated, the control unit 80 is configured to cause the first micro DC/DC converter unit 12 to supply the electric power to the first low voltage load 42 via the first single switch element 51 and the second low voltage load 43 via the second single switch element 52. Thus, despite the deactivation of the first main DC/DC converter unit 11 and the failure of the second micro DC/DC converter unit 22, the first micro DC/DC converter unit 12 may continue to supply the electric power from the first high voltage system 13 to the first low voltage system 41.

It has to be noted that examples of the disclosure are described with reference to different subject matters. In particular, some examples are described with reference to method type claims whereas other examples are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed examples. Other variations to the disclosed examples can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A converter system for transferring electric power comprising:
    a first direct current/direct current (DC/DC) converter module,
    a second DC/DC converter module, and
    a control unit,
    the first DC/DC converter module being connectable to a first high voltage system and at least to a first low voltage system,
    the second DC/DC converter module being connectable to a second high voltage system and at least to the first low voltage system,
    the first DC/DC converter module comprising at least a first main DC/DC converter unit and a first micro DC/DC converter unit,
    the second DC/DC converter module comprising at least a second micro DC/DC converter unit,
    the first micro DC/DC converter unit and the second micro DC/DC converter unit being connectable via a first bidirectional switch unit,
    the control unit being configured to transfer the electric power from the first high voltage system to the first low voltage system via the first micro DC/DC converter unit, if the first main DC/DC converter unit is deactivated, and
    the control unit being further configured to open the first bidirectional switch unit to transfer the electric power from the second high voltage system to the first low voltage system via the second micro DC/DC converter unit, if the first main DC/DC converter unit is deactivated and the first micro DC/DC converter unit has a failure.

2. The converter system according to claim 1, the control unit being further configured to open the first bidirectional switch unit to transfer the electric power from the first high voltage system to the first low voltage system via the first micro DC/DC converter unit, if the first main DC/DC converter unit is deactivated and the second micro DC/DC converter unit has a failure.

3. The converter system according to claim 1, the second micro DC/DC converter unit being further connectable to a second low voltage system, the control unit being configured to transfer the electric power from the first high voltage system to the second low voltage system via the first micro DC/DC converter unit.

4. The converter system according to claim 3, the control unit being further configured to transfer the electric power from both of the first and second high voltage system to each of the first and second low voltage system via the first micro DC/DC converter unit and the second micro DC/DC converter unit, if a sum of the electric power to be transferred to the first and second low voltage systems exceeds an available power of the first micro DC/DC converter unit.

5. The converter system according to claim 3, the control unit being further configured to deactivate the second low voltage system, if the first main DC/DC converter unit is deactivated and the second micro DC/DC converter unit has a failure.

6. The converter system according to claim 1, the second DC/DC converter module further comprising a second main DC/DC converter unit, the second main DC/DC converter unit being connectable at least to the first low voltage system.

7. The converter system according to claim 1, the first low voltage system comprising at least a first low voltage load and a second low voltage load,
a first single switch element being arranged between the first low voltage load and the first micro DC/DC converter unit,
a second single switch element being arranged between the second low voltage load and the first micro DC/DC converter unit, and
the control unit being configured to open the first single switch element, if the first main DC/DC converter unit being deactivated and the first low voltage load has a failure.

8. The converter system according to claim 7, the control unit being configured to transfer a high current from the first main DC/DC converter unit to the first micro DC/DC converter unit via the first single switch element or the second single switch element, if the first main DC/DC converter unit is activated and the first micro DC/DC converter unit has a failure.

9. The converter system according to claim 1, the converter system further comprising a second bidirectional switch unit and a third bidirectional switch unit, the second bidirectional switch unit being arranged between the second micro DC/DC converter unit and the first low voltage load and the third bidirectional switch unit being arranged between the second micro DC/DC converter unit and the second low voltage load, and the control unit being configured to transfer a high current from the second main DC/DC converter unit to the second micro DC/DC converter unit via the second bidirectional switch unit or the third bidirectional switch unit, if the first main DC/DC converter unit is activated and the second micro DC/DC converter unit has a failure.

10. The converter system according to claim 1, the first main DC/DC converter unit and the second main DC/DC converter unit being configured to provide higher electric power than the first micro DC/DC converter unit and the second micro DC/DC converter unit.

11. The converter system according to claim 1, the first micro DC/DC converter unit being configured to provide a lower electric power than the second micro DC/DC converter unit.

12. The converter system according to claim 1, each of the first, the second and the third bidirectional switch units comprising a pair of MOSFET elements and each of the first and second single switch elements comprising a smart FET element.

13. A vehicle comprising:
a converter system, the converter system comprising:
a first direct current/direct current (DC/DC) converter module
a second DC/DC converter module and
a control unit,
the first DC/DC converter module being connectable to a first high voltage system and at least to a first low voltage system,
the second DC/DC converter module being connectable to a second high voltage system and at least to the first low voltage system,
the first DC/DC converter module comprising at least a first main DC/DC converter unit and a first micro DC/DC converter unit,
the second DC/DC converter module comprising at least a second micro DC/DC converter unit,
the first micro DC/DC converter unit and the second micro DC/DC converter unit being connectable via a first bidirectional switch unit,
the control unit being configured to transfer the electric power from the first high voltage system to the first low voltage system via the first micro DC/DC converter unit, if the first main DC/DC converter unit is deactivated, and
the control unit being further configured to open the first bidirectional switch unit to transfer the electric power from the second high voltage system to the first low voltage system via the second micro DC/DC converter unit, if the first main DC/DC converter unit is deactivated and the first micro DC/DC converter unit has a failure,
the vehicle being a battery electric vehicle or a hybrid electric vehicle.

14. The vehicle according to claim 13, if a first main DC/DC converter unit or a second main DC/DC converter unit is deactivated, the vehicle being in a parking state and if the first main DC/DC converter unit or the second main DC/DC converter unit is activated, the vehicle being in a driving or charging mode.

15. A method for transferring electric power, comprising:
transferring the electric power from a first high voltage system to a first low voltage system via a first micro DC/DC converter unit, if a first main DC/DC converter unit is deactivated, and
opening a first bidirectional switch unit to transfer the electric power from a second high voltage system to the first low voltage system via a second micro DC/DC converter unit, if the first main DC/DC converter unit is deactivated and the first micro DC/DC converter unit has a failure,
a first DC/DC converter module being connectable to the first high voltage system and at least to the first low voltage system, a second DC/DC converter module being connectable to the second high voltage system and at least to the first low voltage system,
the first DC/DC converter module comprising at least the first main DC/DC converter unit and the first micro DC/DC converter unit,
the second DC/DC converter module comprising at least the second micro DC/DC converter unit, and
the first micro DC/DC converter unit and the second micro DC/DC converter unit being connectable via the first bidirectional switch unit.

* * * * *